United States Patent
Brinas

(10) Patent No.: US 9,120,401 B2
(45) Date of Patent: Sep. 1, 2015

(54) ADAPTABLE BIN WITH RETRACTABLE CUP HOLDER

(71) Applicant: GM GLOBAL TECHNOLOGY OPERATIONS LLC, Detroit, MI (US)

(72) Inventor: Gerard Brinas, Sterling Heights, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 221 days.

(21) Appl. No.: 13/858,157

(22) Filed: Apr. 8, 2013

(65) Prior Publication Data

US 2014/0299612 A1    Oct. 9, 2014

(51) Int. Cl.
*B60N 3/10*    (2006.01)

(52) U.S. Cl.
CPC ............. *B60N 3/102* (2013.01); *B60N 3/106* (2013.01)

(58) Field of Classification Search
CPC ....................................... B60N 3/102
USPC .......... 220/737, 738; 224/281, 282, 926, 485; 296/37.1, 37.12, 37.13, 37.14, 37.8; 248/311.2

See application file for complete search history.

(56) References Cited

U.S. PATENT DOCUMENTS

| | | | | |
|---|---|---|---|---|
| 5,285,953 | A | * | 2/1994 | Smith .......................... 220/737 |
| 6,036,152 | A | * | 3/2000 | Hiscox et al. .............. 248/311.2 |
| 6,705,580 | B1 | * | 3/2004 | Bain .......................... 248/311.2 |
| 6,758,452 | B1 | * | 7/2004 | Salenbauch et al. ....... 248/311.2 |
| 6,964,398 | B1 | * | 11/2005 | Faulkner .................... 248/213.2 |
| 8,695,843 | B1 | * | 4/2014 | Brinas .......................... 220/737 |
| 2006/0243875 | A1 | * | 11/2006 | Chen .......................... 248/311.2 |
| 2007/0138225 | A1 | * | 6/2007 | Duchesne .................... 224/544 |

* cited by examiner

*Primary Examiner* — Fenn Mathew
*Assistant Examiner* — Robert Stodola
(74) *Attorney, Agent, or Firm* — Quinn Law Group, PLLC

(57) ABSTRACT

A cup holder is provided. The cup holder is selectively movable about an axis between a stowed position and a deployed position. The cup holder includes a support base rotatable about the axis. The cup holder also includes an arm extending upward from the support base. The arm is rotatable to define the stowed position and the deployed position.

18 Claims, 5 Drawing Sheets

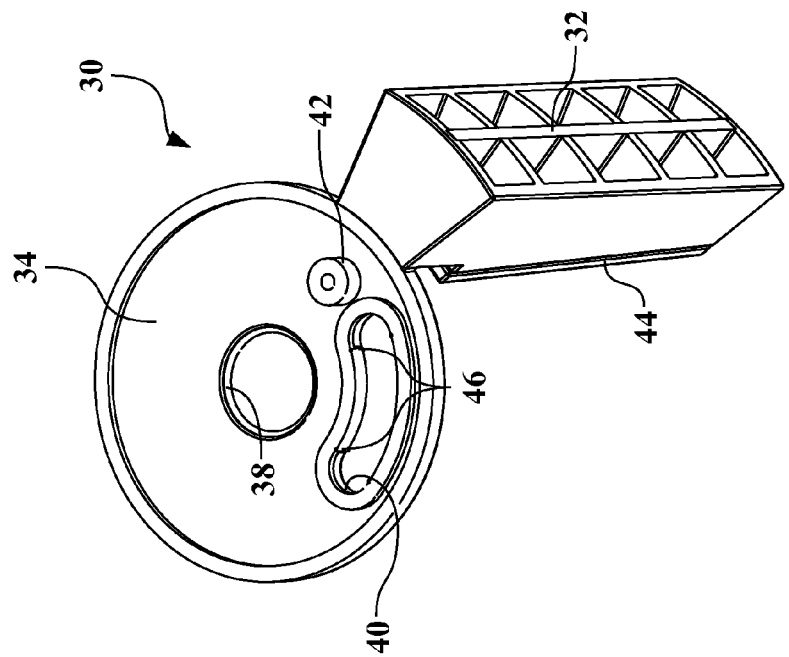
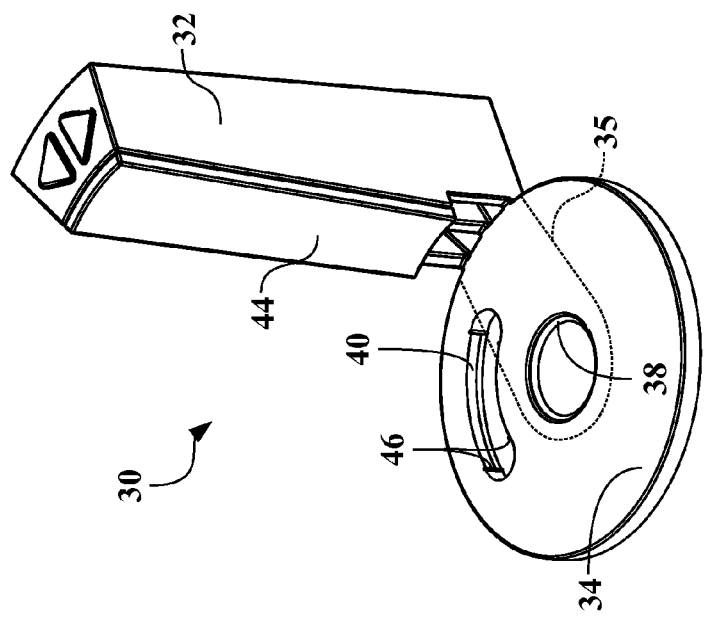
Figure 3B
Figure 3A

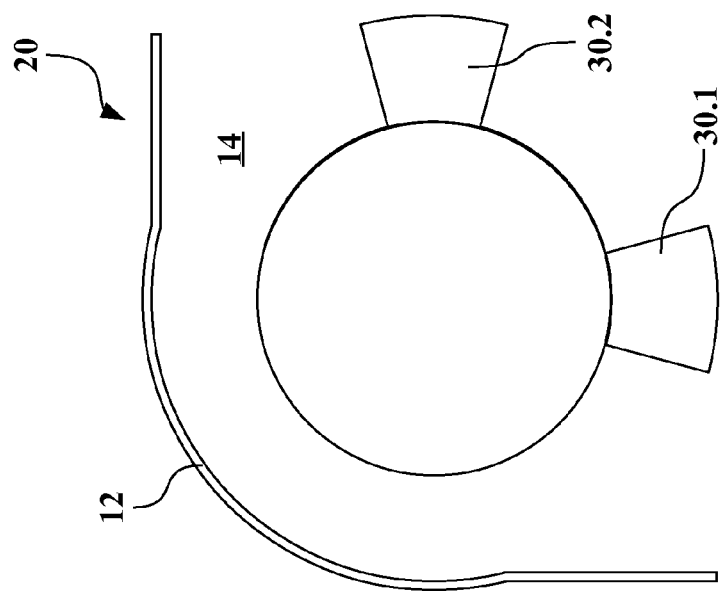
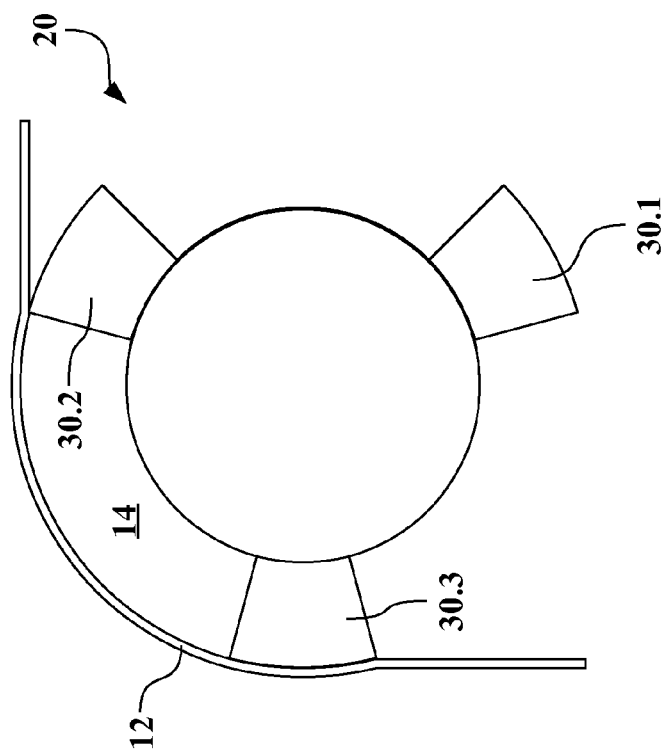

ADAPTABLE BIN WITH RETRACTABLE CUP HOLDER

TECHNICAL FIELD

This disclosure relates to storage bins and cup holders, particularly those used in vehicles.

BACKGROUND

Storage bins may be used to hold various items in the vehicle, including electronics, vehicle accessories, or personal items. Some vehicles may include one or more cup holders designed to support and grasp liquid containers used by occupants within the vehicle.

SUMMARY

A cup holder, which may be used with an adaptable storage bin, is provided. The cup holder is selectively movable about an axis between a stowed position and a deployed position. The cup holder includes a support base rotatable about the axis. The cup holder also includes an arm extending upward from the support base. The arm is rotatable to define the stowed position and the deployed position.

The arm and the support base may be considered a first wall unit. The cup holder may also include a second wall unit having a support base rotatable about the axis; and an arm extending upward from the support base. The first wall unit is proximal to the second wall unit in the stowed position and is distal to the second wall unit in the deployed position.

The above features and advantages, and other features and advantages, of the present invention are readily apparent from the following detailed description of some of the best modes and other embodiments for carrying out the invention, which is defined solely by the appended claims, when taken in connection with the accompanying drawings.

BRIEF DESCRIPTION OF THE DRAWINGS

FIG. 3A is a schematic isometric view of a wall unit for the retractable cup holders shown in FIGS. 1 and 2;

FIG. 3B is a schematic isometric view of the underside of the wall unit shown in FIG. 3A;

FIG. 5C is a schematic top view illustration of one configuration for the cup holders shown in FIGS. 1, 2 and 4; and FIG. 5D is a schematic top view illustration of one configuration for the cup holders shown in FIGS. 1, 2 and 4.

DETAILED DESCRIPTION

Figure 1:
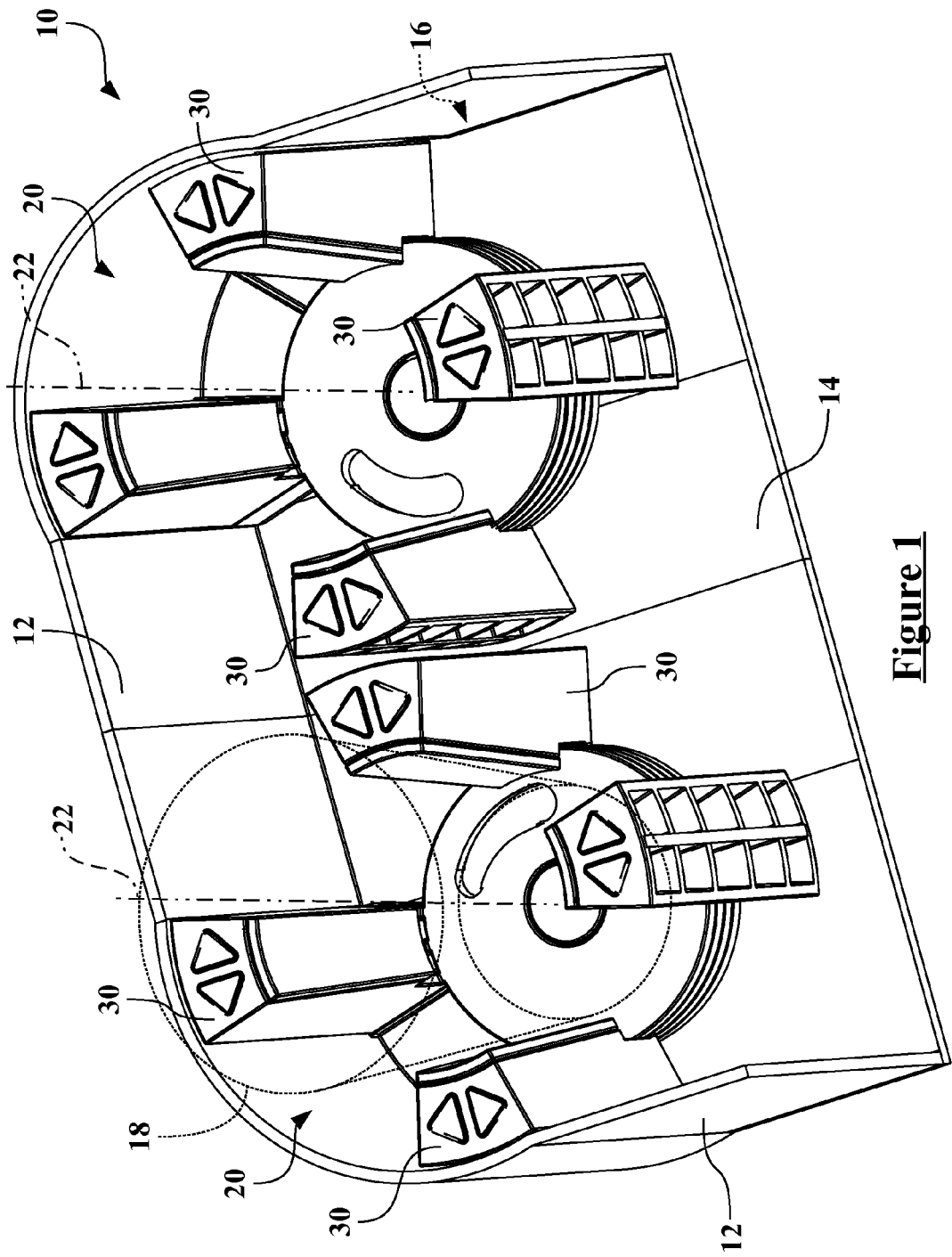
FIG. 1 is a schematic isometric view of an adaptable bin holding a plurality of cups in retractable cup holders.

Referring to the drawings, like reference numbers correspond to like or similar components wherever possible throughout the several figures. FIG. 1 shows an adaptable bin 10 for a vehicle (not shown), which may be used for storage of numerous objects or components. The adaptable bin 10 may be located in the passenger compartment or elsewhere within the vehicle.

While the present invention may be described with respect to automotive or vehicular applications, those skilled in the art will recognize the broader applicability of the invention. Those having ordinary skill in the art will recognize that terms such as "above," "below," "upward," "downward," et cetera, are used descriptively of the figures, and do not represent limitations on the scope of the invention, as defined by the appended claims. Any numerical designations, such as "first" or "second" are illustrative only and are not intended to limit the scope of the invention in any way.

Features shown in one figure may be combined with, substituted for, or modified by, features shown in any of the figures. Unless stated otherwise, no features, elements, or limitations are mutually exclusive of any other features, elements, or limitations. Any specific configurations shown in the figures are illustrative only and the specific configurations shown are not limiting of the claims or the description. All elements may be mixed and matched between figures.

The adaptable bin 10 includes a bin wall 12 and a bin floor 14, which cooperate to define a storage volume 16. The storage volume 16 is illustratively shown by dashed lines approximating the edges of the storage volume 16 defined by the portions of the bin floor 14 and the bin wall 12 shown. Therefore, based upon the configuration of the bin wall 12 and the bin floor 14, the storage volume 16 may vary in size and shape from that illustrated in the figures. The storage volume 16 may be partially defined by adjacent components, some of which may function as, or form, portions of the bin wall 12.

In the configuration shown, the bin wall 12 and the bin floor 14 are generally perpendicular to one another. However, the bin wall 12 and the bin floor 14 need not be perpendicular and in many cases the bin wall 12 will have an obtuse angle relative to the bin floor 14. The bin wall 12 and the bin floor 14 are also shown intersecting at substantially right angles. However, many production versions of the adaptable bin 10 will include fillets, bosses, or other protrusions into the storage volume 16 at, or near, the intersection of the bin wall 12 and the bin floor 14.

In FIG. 1, the adaptable bin 10 is configured to hold one or more cups 18 at least partially within the storage volume 16. Each cup 18 is disposed within a retractable cup holder 20 (which may be referred to herein simply as a cup holder 20).

While two cup holders 20 and one cup 18 are shown in FIG. 1, additional or fewer cups 18 may be placed or stored within the storage volume 16, depending upon the configuration and the number of cup holders 20 incorporated therein. The storage volume 16 substantially encapsulates all of the cup holders 20, such that the retractable cup holders 20 selectively block or occupy a portion of the storage volume 16. The cup holders 20 may be numbered, such as a first through a second cup holder 20, but any numbering is for illustrative purposes only.

A cup holder axis 22 (which may be referred to herein simply as the axis 22) is substantially central to the cup holders 20. As described herein, the cup holders 20 may be selectively moved between stowed states (not shown in FIG. 1) and deployed states (shown in FIG. 1). In some embodiments of the adaptable bin 10, portions of the cup holders 20 may extend slightly above the bin wall 12, such that a portion of the cup holders 20 may be above the storage volume 16.

In the adaptable bin 10 shown, each of the cup holders 20 is substantially symmetric about its respective axis 22. However, one or more of the cup holders 20 may be asymmetric.

For example, the upper portion of the cup holder 20 may extend further from the bin wall 12 into the storage volume 16 to allow for larger containers or for cups 18 having handles.

Figure 2:
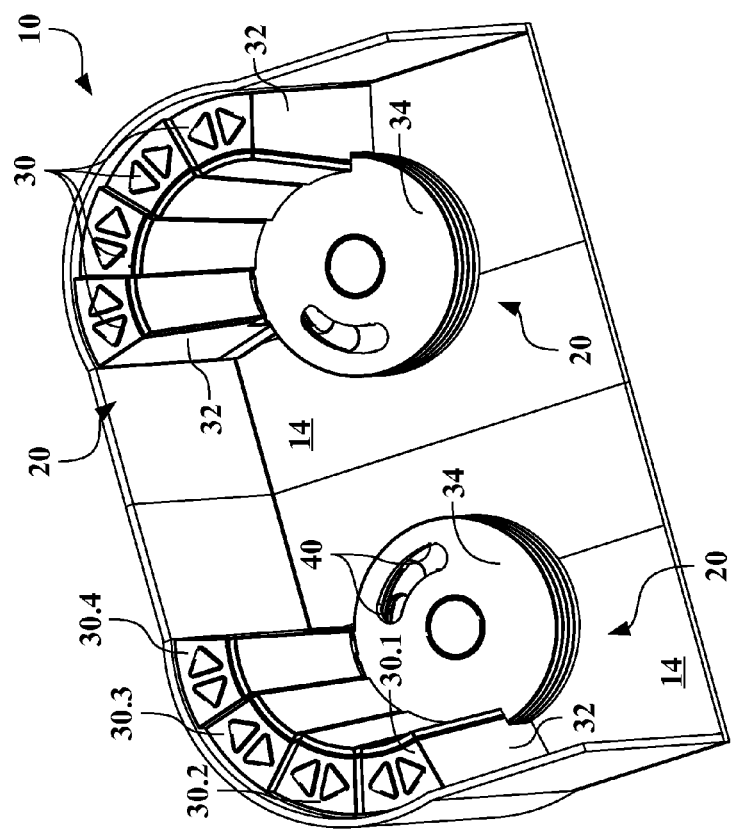
FIG. 2 is a schematic isometric view of the adaptable bin of FIG. 1, shown with the cups removed to illustrate the retractable cup holders in a stowed state.

Referring also to FIG. 2, FIG. 3A, and FIG. 3B, and with continued reference to FIG. 1, there are shown additional views of portions of the adaptable bin 10 and the cup holders 20. FIG. 2 shows the adaptable bin 10 with the cups 18 removed to illustrate the retractable cup holders 20 in a stowed state. FIG. 3A shows an isolated view of a wall unit 30, which forms the moveable portions of the cup holder 20. FIG. 3B shows the underside of the wall unit 30 shown in FIG. 3A. Elements and components of the cup holders 20 will be described interchangeably with reference to FIGS. 2, 3A, and 3B.

The cup holder 20 is selectively moveable between the stowed position (shown in FIG. 2) and the deployed position (shown in FIG. 1) by rotation of the wall units 30 about the axis 22. As shown in FIG. 2, although substantially identical, the wall units 30 may be labeled a first wall unit 30.1, a second wall unit 30.2, a third wall unit 30.3, and a fourth wall unit 30.4. Numerical designation is for illustrative purposes only, and the wall units 30 may be designated in any order or randomly. The first wall unit 30.1 is proximal to the second wall unit 30.2 in the stowed position and is rotated about the axis 22 to be distal to the second wall unit 30.2 in the deployed position.

As shown in FIGS. 3A and 3B, the wall units 30 include an arm 32 extending upward from a support base 34. The support base 34 is rotatable about the axis 22, such that the arm 32 is rotatable about the axis 22 between the stowed position (shown in FIG. 2) and the deployed position (shown in FIG. 1).

In the stowed position, the wall units 30 are generally withdrawn from the storage volume 16 and are generally unable to hold the cups 18. However, in the deployed position, the wall units 30 are within the storage volume 16 and are generally able to hold the cups 18.

In the configuration shown, the support base 34 is a disc. However, some configurations may not require all, or any, of the disc shape, and a minimal base 35 is illustrated with dashed lines. The minimal base 35 is sufficient to support the arm 32 in substantially upright and to provide rotation about the axis 22.

Each of the wall units 30 includes the arm 32 and the support base 34 and are rotatable about the axis 22. The wall units 30 may be formed from a single piece of plastic, such as by molding; from metal, such as by casting or billet machining; or from another suitable material.

Figure 4:
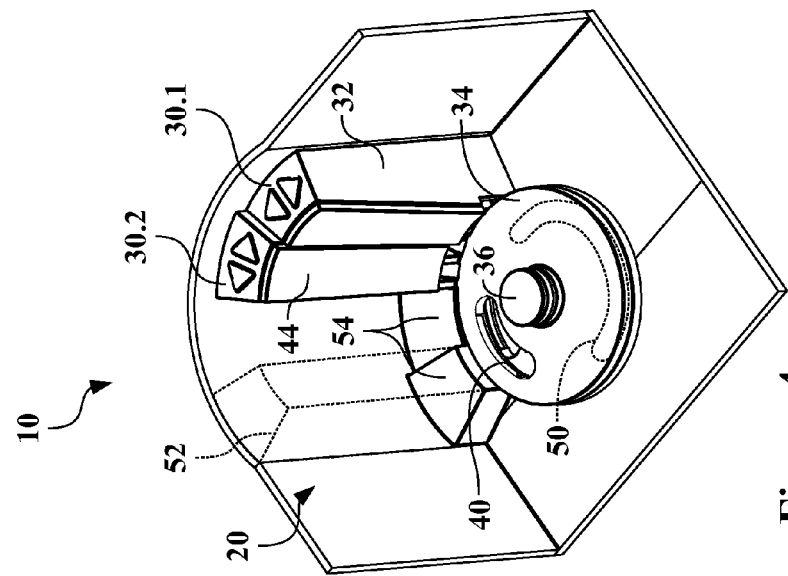
FIG. 4 is a schematic isometric view of a portion of the adaptable bin of FIG. 1, illustrated with only two wall units.

Referring also to FIG. 4, and with continued reference to FIGS. 1-3B, there is shown a view of the adaptable bin 10 showing only two of the wall units 30, the first wall unit 30.1 and the second wall unit 30.2. As viewable in FIG. 4, the adaptable bin 10 includes a rotation cylinder 36 operatively attached to the bin floor 14 and aligned with the axis 22. The rotation cylinder 36 may be formed as one piece with the bin floor 14 or may be attached to the bin floor 14.

The support base 34 of the first wall unit 30.1 is rotatably attached to the rotation cylinder 36 and the support base 34 of the second wall unit 30.2 is rotatably attached to the rotation cylinder 36 above the first wall unit 30.1. Therefore the first wall unit 30.1 and the second wall unit 30.2 may rotate relative to each other and to the bin wall 12 and the bin floor 14.

As viewed in FIGS. 3A and 3B, a snap flange 38 is formed in the support base 34 of the wall units 30. The snap flange 38 interacts with the rotation cylinder 36 to allow rotation of the wall unit 30 about the axis 22 while restricting movement vertically along the axis 22.

A pin slot 40 is formed in the support base 34 of the wall units 30, and a pin 42 extends downward from the support base 34 of the wall units 30. Therefore, for example, the pin 42 of the second wall unit 30.2 cooperates with the pin slot 40 of the first wall unit 30.1 to limit relative rotation between the first wall unit 30.1 and the second wall unit 30.2. In configurations with the pin slot 40, the minimal base 35 may be larger and incorporate the pin slot 40.

In operation of the cup holder 20, as the first wall unit 30.1 rotates approximately 60-90 degrees away from the stowed position, the pin slot 40 of the first wall unit 30.1 grabs the pin 42 extending downward from the second wall unit 30.2. Further movement of the first wall unit 30.1 pulls the second wall unit 30.2 into rotation behind the first wall unit 30.1.

A pad member 44 may be attached to the arm 32 between the axis 22 and the arm 32. The pad member 44 may be formed from rubber or textured plastic and may be configured to hold the cups 18 in place.

The wall units 30 may include one or more detents 46 formed at one end or the other of the pin slot 40. The detents 46 cooperate with the pin 42 to restrict movement of the pin 42 within the pin slot 40, such that the wall units 30 are held in either the stowed or deployed position, even under acceleration from the vehicle.

The adaptable bin 10 may include a floor slot 50 formed in the bin floor 14. The floor slot 50 is shown in dashed lines in FIG. 4. The pin 42 of the first wall unit 30.1 cooperates with the floor slot 50 to limit rotation of the first wall unit 30.1. The floor slot 50 is larger than the pin slot 40 formed on the wall units 30 because the first wall unit 30.1 rotates further relative to the bin floor 14 than, for example, the second wall unit 30.2 relative to the first wall unit 30.1.

The bin wall 12 may have a molded arm 52, which may take the place of a fourth wall unit 30.4. In FIG. 4, the molded arm 52 is illustrated in dashed lines. Alternatively, the cup holder 20 may include only three wall units 30 and the bin wall 12 may act to restrain the cup 18 while the cup holder 20 is in the deployed position.

The adaptable bin 10 shown includes one or more steps 54 formed on the bin floor 14. The second wall unit 30.2 and the third wall unit 30.3—and the fourth wall unit 30.4, if included—may sit on the steps 54 when the cup holder 20 is in the stowed position. The steps 54 may also limit rotation of the wall units 30 when moving into the stowed position to prevent over-rotation.

Referring now to FIGS. 5A, 5B, 5C, and 5D, and with continued reference to FIGS. 1-4, there are shown schematic top views of various configurations of wall units 30 to form cup holders 20. FIGS. 5A, 5B, 5C, and 5D show cup holders 20 formed or assembled from different numbers of the wall units 30, but generally include the same or similar components.

Figure 5B:
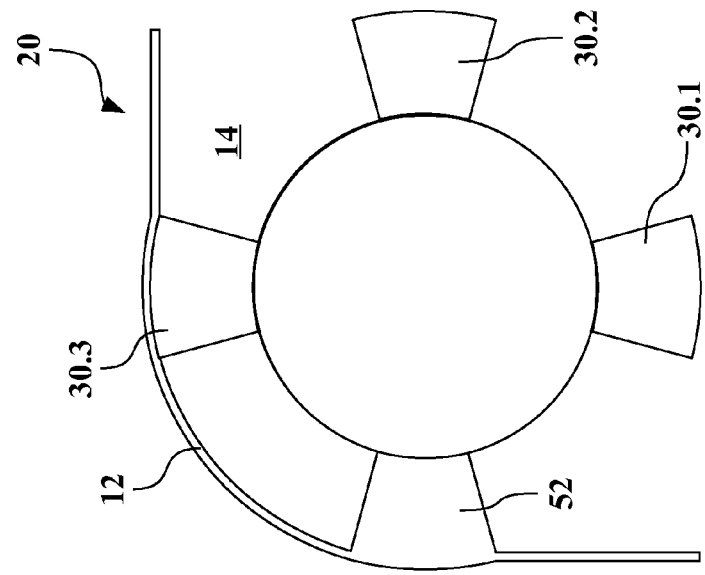
FIG. 5B is a schematic top view illustration of one configuration for the cup holders shown in FIGS. 1, 2 and 4.
Figure 5A:
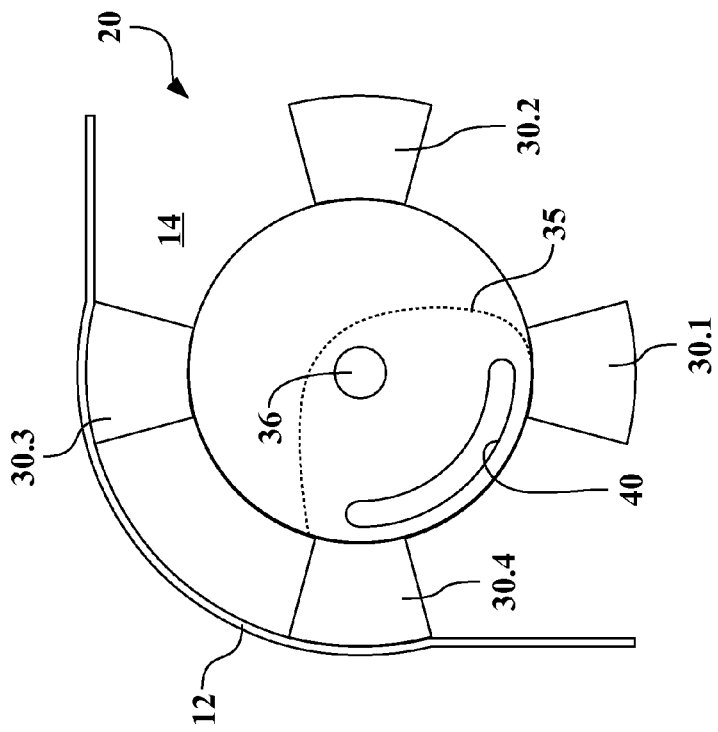
FIG. 5A is a schematic top view illustration of one configuration for the cup holders shown in FIGS. 1, 2 and 4.

FIG. 5A shows a diagrammatic top view of the cup holder 20 in the deployed position. In FIG. 5A, four wall units 30 are rotated about the rotation cylinder 36. The cup holder 20 shown in FIG. 5A also illustrates the outline of the minimal base 35 (in dashed lines) that may be incorporated when the wall units 30 include the pin slot 40.

FIG. 5A illustrates the amount of rotation of the individual wall units 30 between the stowed position and the deployed position. The first wall unit 30.1 rotates approximately 180 degrees about the axis 22 and the second wall unit 30.2 rotates approximately 120 degrees about the axis 22 between the respective stowed positions and the deployed positions.

Similarly, the third wall unit 30.3 rotates approximately 60 degrees about the axis 22 between the stowed position and the deployed position. The fourth wall unit 30.4 does not rotate in the configuration shown.

Alternatively, the first wall unit 30.1 may continue to rotate, such that the second wall unit 30.2, the third wall unit 30.3, and the fourth wall unit 30.4 are further pulled around the axis 22. Rotation of the first wall unit 30.1 may continue until the first wall unit 30.1 reaches the location of the fourth wall unit 30.4 shown in FIG. 5A or is stopped by the step 54 below the fourth wall unit 30.4.

FIG. 5B shows a configuration with three wall units 30. In this configuration, the first wall unit 30.1, the second wall unit 30.2, and the third wall unit 30.3 act substantially identical to the configuration shown in FIG. 5A. However, the fourth wall unit 30.4 is replaced by the molded arm 52 in FIG. 5B.

The configuration shown in FIG. 5B reduces the total number of moving components by incorporating one point of contact for the cup 18 into the bin wall 12. The molded arm 52 may be formed as an integral, one-piece, element with the bin wall 12 or may be formed separately and then attached to the bin wall 12. Alternatively, the bin wall 12 may be formed as shown FIG. 5A, such that the standard bin wall 12 acts as a point of contact for the cup 18.

FIG. 5C shows a configuration with three wall units 30, which are spaced with approximately 120 degrees of rotation (center-to-center) between each wall unit 30 when in the deployed position. Note that if pin slots 40 are used in the wall units 30, the length (or angular spread) of the pin slots 40 will be adjusted accordingly.

FIG. 5D shows a configuration with only two wall units 30. In FIG. 5, the wall units 30 provide two points of contact for the cup 18 and the bin wall 12 provides the other point of contact. In an alternative configuration, where the bin wall 12 is curved sufficiently, the cup 18 may be held between the bin wall 12 and only one wall unit 30.

The detailed description and the drawings or figures are supportive and descriptive of the invention, but the scope of the invention is defined solely by the claims. While some of the best modes and other embodiments for carrying out the claimed invention have been described in detail, various alternative designs, configurations, and embodiments exist for practicing the invention defined in the appended claims.

The invention claimed is:

1. A cup holder selectively movable about an axis between a stowed position and a deployed position, comprising:
   a first wall unit having:
      a support base rotatable about the axis; and
      an arm extending upward from the support base, such that the arm is rotatable to define the stowed position and the deployed position; and
   a second wall unit having:
      a support base rotatable about the axis; and
      an arm extending upward from the support base;
   wherein the arm of the first wall unit is proximal to the arm of the second wall unit in the stowed position and is distal to the arm of the second wall unit in the deployed position.

2. The cup holder of claim 1, wherein the support base of the second wall unit is disposed above the support base of the first wall unit, and further comprising:
   a pin extending downward from the support base of the second wall unit; and
   a pin slot formed in the support base of the first wall unit;
   wherein the pin of the second wall unit cooperates with the pin slot of the first wall unit to limit relative rotation between the first wall unit and the second wall unit.

3. The cup holder of claim 2, further comprising:
   a first detent formed at one end of the pin slot; and
   a second detent formed at the other end of the pin slot;
   wherein the first detent and the second detent cooperate with the pin of the second wall unit to restrict movement of the pin within the pin slot.

4. The cup holder of claim 3, wherein the first wall unit and the second wall unit are substantially identical, such that the first wall unit includes a pin and the second wall unit includes a pin slot.

5. An adaptable bin having a cup holder defined relative to an axis, comprising:
   a bin floor;
   a bin wall;
   a first wall unit, including;
      a support base rotatable about the axis; and
      an arm extending upward from the support base, such that the arm is rotatable about the axis;
   a second wall unit, including;
      a support base rotatable about the axis; and
      an arm extending upward from the support base, such that the arm is rotatable about the axis;
   wherein the arm of the first wall unit is proximal to the arm of the second wall unit in the stowed position and the arm of the first wall unit is rotated about the axis to be distal to the arm of the second wall unit in the deployed position.

6. The adaptable bin of claim 5, further comprising:
   a rotation cylinder operatively attached to the bin floor and aligned with the axis,
   wherein the support base of the first wall unit is rotatably attached to the rotation cylinder and the support base of the second wall unit is rotatably attached to the rotation cylinder above the first wall unit.

7. The adaptable bin of claim 6, further comprising:
   a pin extending downward from the support base of the second wall unit; and
   a pin slot formed in the support base of the first wall unit;
   wherein the pin of the second wall unit cooperates with the pin slot of the first wall unit to limit relative rotation between the first wall unit and the second wall unit.

8. The adaptable bin of claim 7, further comprising:
   a pin extending downward from the support base of the first wall unit; and
   a floor slot formed in the bin floor;
   wherein the pin of the first wall unit cooperates with the floor slot to limit rotation of the first wall unit.

9. The adaptable bin of claim 8, further comprising:
   a third wall unit, including;
      a support base rotatably attached to the rotation cylinder above the second wall unit;
      an arm extending upward from the support base, such that the arm is rotatable about the axis;
      a pin extending downward from the support base;
   a pin slot formed in the support base of the second wall unit, wherein the pin of the third wall unit cooperates with the pin slot of the second wall unit to limit relative rotation between the first wall unit and the second wall unit, and
   wherein the arm of the first wall unit is proximal to the arm of the second wall unit and the arm of the third wall unit in the stowed position and the arm of the first wall unit is distal to the arm of the second wall unit and the arm of the third wall unit in the deployed position.

10. The adaptable bin of claim 9,
    wherein the first wall unit rotates at least approximately 180 degrees about the axis between the stowed position and the deployed position;

wherein the second wall unit rotates at least approximately 120 degrees about the axis between the stowed position and the deployed position; and wherein the third wall unit rotates at least approximately 60 degrees about the axis between the stowed position and the deployed position.

11. The adaptable bin of claim 10, further comprising:
a first detent formed at one end of the pin slot;
a second detent formed at the other end of the pin slot; and
wherein the first detent and the second detent cooperate with the pin of the second wall unit to restrict movement of the pin within the pin slot of the first wall unit.

12. The adaptable bin of claim 11, further comprising:
a second-unit step formed on the bin floor, wherein the second wall unit sits on the second-unit step and the first wall unit abuts the second-unit step when in the stowed position; and
a third-unit step formed on the bin floor, wherein the third wall unit sits on the third-unit step and the second wall unit abuts the third-unit step when in the stowed position.

13. The adaptable bin of claim 12, further comprising:
a snap flange formed in the support base of the second wall unit and the third wall unit; and
wherein the snap flange interacts with the rotation cylinder to allow rotation of the second wall unit and the third wall unit and to restrict movement of the second wall unit and the third wall unit along the axis.

14. The adaptable bin of claim 5, further comprising:
a pin extending downward from the support base of the second wall unit; and
a pin slot formed in the support base of the first wall unit;
wherein the pin of the second wall unit cooperates with the pin slot of the first wall unit to limit relative rotation between the first wall unit and the second wall unit.

15. The adaptable bin of claim 5, further comprising:
a pin extending downward from the support base of the first wall unit; and
a floor slot formed in the bin floor;
wherein the pin of the first wall unit cooperates with the floor slot to limit rotation of the first wall unit.

16. The adaptable bin of claim 15, wherein the first wall unit rotates at least approximately 180 degrees about the axis between the stowed position and the deployed position; wherein the second wall unit rotates at least approximately 120 degrees about the axis between the stowed position and the deployed position.

17. The adaptable bin of claim 5, wherein the first wall unit rotates at least approximately 120 degrees about the axis between the stowed position and the deployed position; wherein the second wall unit rotates at least approximately 60 degrees about the axis between the stowed position and the deployed position.

18. The adaptable bin of claim 9, further comprising:
a second-unit step formed on the bin floor, wherein the second wall unit sits on the second-unit step and the first wall unit abuts the second-unit step when in the stowed position; and
a third-unit step formed on the bin floor, wherein the third wall unit sits on the third-unit step and the second wall unit abuts the third-unit step when in the stowed position.

* * * * *